United States Patent [19]
Smith et al.

[11] Patent Number: 5,896,630
[45] Date of Patent: Apr. 27, 1999

[54] SELF LOCKING SNAP HOOK

[75] Inventors: Keith A. Smith, Burlington; Steve B. Levay, Font Hill; Harvey Simpson, Welland, all of Canada

[73] Assignee: Haun Drop Forge Co., Ltd., Canada

[21] Appl. No.: 09/018,014

[22] Filed: Feb. 3, 1998

[51] Int. Cl.⁶ .................................................. F16B 45/02
[52] U.S. Cl. ........................................ 24/600.1; 24/600.2
[58] Field of Search .......................... 294/82.21, 82.2; 24/599.5, 600.1, 600.2, 599.4, 599.6, 599.7, 599.8

[56] References Cited

U.S. PATENT DOCUMENTS

| | | |
|---|---|---|
| 374,330 | 12/1887 | Wikman . |
| 1,660,927 | 2/1928 | Larsen ..................................... 24/600.2 |
| 1,818,900 | 7/1931 | Deppe .................................. 294/82.21 |
| 2,116,880 | 5/1938 | Dee ....................................... 294/82.21 |
| 2,490,931 | 12/1949 | Thompson . |
| 3,719,974 | 3/1973 | Abrams et al. . |
| 4,613,180 | 9/1986 | Pope ....................................... 294/82.21 |
| 5,257,441 | 11/1993 | Barlow ................................ 24/600.1 X |
| 5,579,564 | 12/1996 | Rullo . |
| 5,735,025 | 4/1998 | Bailey .................................... 24/600.1 |

FOREIGN PATENT DOCUMENTS

| | | |
|---|---|---|
| 318-742 | 6/1989 | European Pat. Off. . |
| 2077838 | 12/1981 | United Kingdom . |

*Primary Examiner*—James R. Brittain
*Attorney, Agent, or Firm*—Merek & Voorhees

[57] ABSTRACT

A self locking snap hook that includes a central shank having an arch shaped hook member that defines a gateway opening at one end, a gate keeper enclosing the gateway opening, a locking lever to prevent the opening of the gate keeper, and a second locking mechanism having an engaged and a disengaged position such that when it is engaged it prevents the locking lever from being disengaged. Movement of the second locking mechanism between its engaged and disengaged positions requires the application of force and resulting movement in a direction other than that required to move the locking lever from its engaged to its disengaged position.

10 Claims, 2 Drawing Sheets

SELF LOCKING SNAP HOOK

FIELD OF THE INVENTION

This invention relates to self locking snap hooks of the type that may be used on safety belts, safety harnesses, safety lines or for similar applications. In particular, the invention relates to a new and improved self locking snap hook that is significantly less prone to accidental opening.

BACKGROUND OF THE INVENTION

Safety and the prevention of falls is of primary importance for individuals working at heights, around areas of excavation, or where a fall could result in serious injury or death. In such cases the employment of a safety system to prevent falls is often not only desirable but a statutory requirement. Typically, safety systems that are commonly used involve the placement of a harness or belt around an individual and then the subsequent use of a rope, cable or strap that physically secures the individual, by way of the belt, to a solid structure. For example, individuals working on bridges, towers or tall buildings will commonly wear belts, safety harnesses or fall arresters that include a lifeline most typically comprised of a rope or strap having one end secured to a structural feature of the device upon which the individual is working. In the logging industry and in situations where individuals work on utility poles, a worker is often fitted with a safety belt having a rope or strap that is connected to the belt at one end, is passed around the tree or pole, and then has its free end connected to the opposite side of the belt. So that the worker may readily engage and disengage the lifeline, rope, cable or strap, at least one end must be fitted with a means to releasably secure it to a solid or safe structure. The other end of the rope or strap may be equally fitted with a means to releasably secure it to the worker's belt or harness, or it may be a more permanent attachment.

In theory, should a worker slip or fall while wearing a safety belt or a harness that is securely attached by way of a lifeline to a solid structure, the worker will only be allowed to fall a very few feet after which his decent will be stopped and he will be suspended until he can regain his balance or be rescued. Unfortunately in practice the safety harness and fall arrest systems currently in use do not always function as designed and accidents, injuries and fatalities sometimes occur. One type of failure that can have disastrous results is a consequence of the use of snap hooks on the end of a lifeline.

Due to their convenience and ease of use, snap hooks having a gate keeper that encloses the hook bowl, are probably the most widely used method to secure the end of a lifeline. Since standard snap hooks can become unintentionally opened through the application of a force against the gate keeper, others have proposed and developed a variety of different locking mechanisms that assist in maintaining the gate keeper in a closed position. While such locking mechanisms have reduced the likelihood of an unintentional opening of the hook, they too suffer from their own limitations. For example, one of the most common locking snap hooks currently in use requires an individual to grasp in his hand both the gate keeper and a locking lever and squeeze them inwardly toward each other in order to "open" the hook. Moving the locking lever inwardly effectively "unlocks" the gate keeper allowing it to also move inwardly so that the hook may be placed over an object or removed therefrom. One of the reasons for the success of this form of locking snap hook is its relative ease of use since an individual can effectively operate the hook through grasping it in one hand. However, the ease of operation of such snap hooks can also result in their unintentional disengagement. Disengagement can occur where the hook is accidentally compressed such that both the locking lever and the gate keeper are pushed inwardly toward the hook bowl at the same time. It has been found that situations as innocuous as leaning against a hook that is bearing against a solid surface can be sufficient to cause accidental disengagement.

SUMMARY OF THE INVENTION

The invention therefore provides a locking snap hook that overcomes the limitations of such prior snap hooks through a structure that helps to prevent unintentional disengagement. In particular, the invention provides a locking snap hook having a second locking mechanism that is disengaged through the application of force and through movement in a direction other than that as is required to disengage a first or primary locking means or lever.

Accordingly, in one of its aspects the invention provides a self locking snap hook comprising, a central shank having an arch shaped hook member at one end, said arch shaped hook member having a hook bowl and a free end, said free end of said hook member and said central shank defining a gateway opening therebetween; a gate keeper having an open position and a closed position, when in said closed position said gate keeper enclosing said gateway opening, when in said open position said gate keeper allowing passage of an object through said gateway opening into said bowl of said hook member; first locking means having an engaged and a disengaged position, when in said engaged position said first locking means preventing said gate keeper from being moved from said closed position to said open position, when in said disengaged position said first locking means permitting said gate keeper to move from said closed to said open position; and, second locking means having an engaged and a disengaged position, when in said engaged position said second locking means preventing said first locking means from being moved from said engaged to said disengaged position, when in said disengaged position said second locking means permitting said first locking means to be moved from said engaged to said disengaged position, wherein movement of said second locking means between said engaged and said disengaged positions requires the application of force and resulting movement in a direction other than that required to move said first locking means from said engaged to said disengaged position.

Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
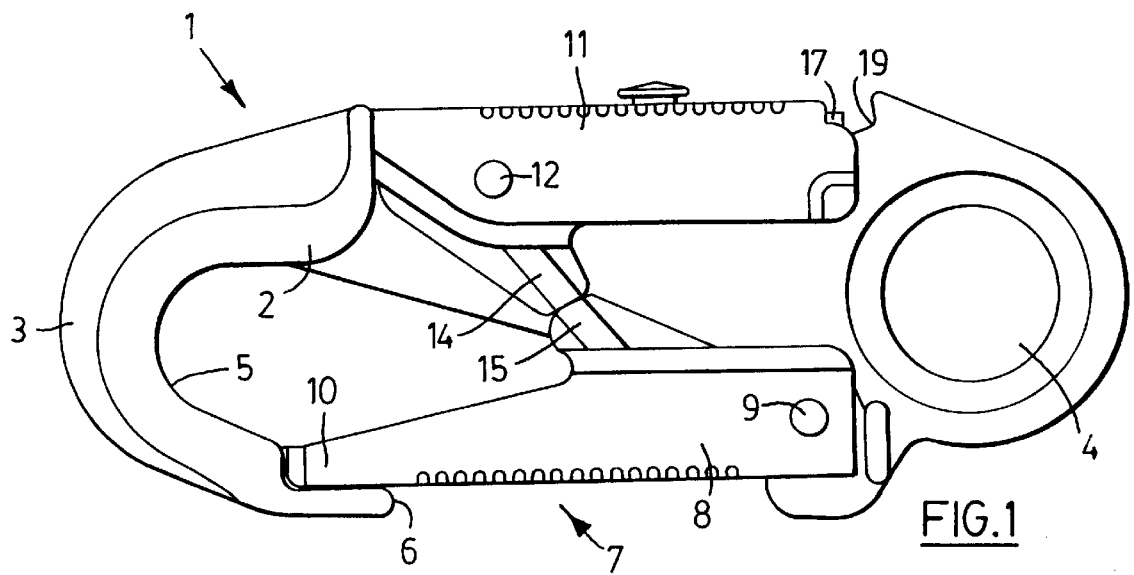
FIG. 1 is a side view of a locking snap hook pursuant to the present invention.

The present invention may be embodied in a number of different forms. However, the specification and drawings that follow describe and disclose only some of the specific forms of the invention and are not intended to limit the scope of the invention as defined in the claims that follow herein.

The self locking snap hook pursuant to the present invention is shown in the attached drawings and noted generally by reference number 1. Snap hook 1 is comprised of a central shank 2 having an arched shaped hook member 3 at one end thereof. The opposite end of shank 2 would typically have formed thereon an eye, clevis or other means to secure the hook to a rope, cable or belt. In the embodiments shown in the attached Figures shank 2 is shown as formed with an eye 4 on its end opposite to hook member 3. Preferably, in order to present an integrally strong hook, central shank 2, hook member 3 and eye 4 are of unitary construction and formed from a high strength alloy steel. The structure may thereafter be forged to further increase its tensile strength.

Arched shaped hook member 3 is of a relatively standard configuration as is commonly used on snap hooks and contains a hook bowl 5 and a free end 6. The distance between free end 6 and central shank 2 defines a gateway opening 7 by which hook 1 may be secured to a device such as an eye bolt, safety cable, etc. So as to enclose gateway opening 7 and prevent hook 1 from sliding off a cable or eye bolt over which it has been placed, hook 1 includes a gate keeper 8 that spans gateway opening 7. Gate keeper 8 has an open position and a closed position such that when it is closed it extends across gateway opening 7. When in its open position gate keeper 8 allows relatively unobstructed passage or entry through gateway opening 7 and into hook bowl 5.

While it will be appreciated by those skilled in the art that a wide variety of different gate keepers may be utilized, including slidably and pivotally mounted versions, in the preferred embodiment shown in the attached drawings gate keeper 8 is pivotally attached to central shank 2 by way of a pin 9. Pin 9 allows gate keeper 8 to be pivoted inwardly toward central shank 2 when moved into its open position, thereby presenting an unobstructed entry into hook bowl 5. In the preferred embodiment the free end 10 of gate keeper 8 is biased against free end 6 of hook member 3 by way of an internal spring mechanism. In this maimer the gate keeper is held tightly against the end of the hook. When an eye bolt or cable is received within hook bowl 5 gate keeper 8 returns to its closed position to help prevent dislodging of the snap hook.

Figure 2:
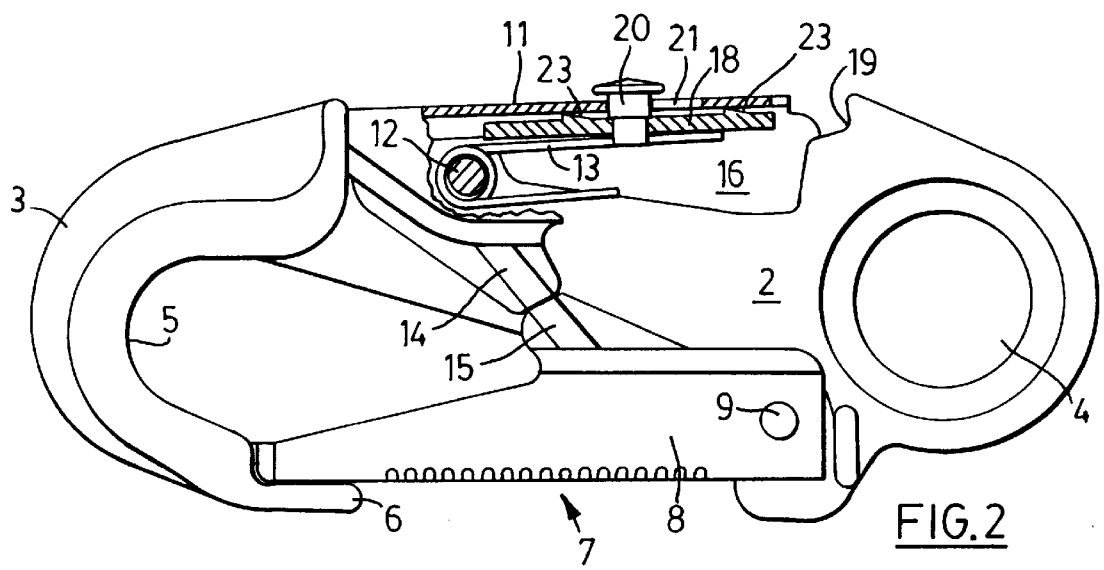
FIG. 2 is a side view of the locking snap hook of FIG. 1 having a portion of its locking lever removed.
Figure 3:
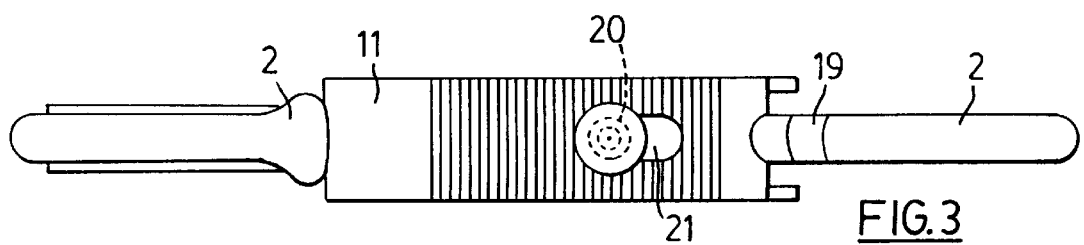
FIG. 3 a partial plan view of the locking snap hook of FIG. 2.
Figure 4:
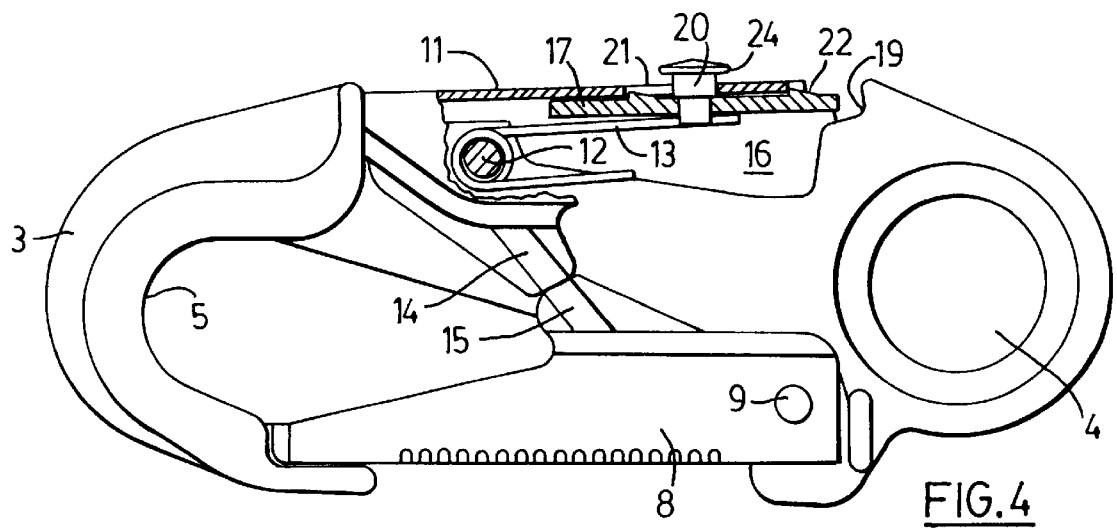
FIG. 4 is a side view of a locking snap hook pursuant to the present invention having a portion of its locking lever removed and having its second locking means in an engaged position.

Snap hook 1 further includes a first locking means comprised generally of a locking lever 11. Locking lever 11 has an engaged and a disengaged position. When locking lever 11 is engaged it prevents the gate keeper from being opened and retains the gate keeper in its closed position with free end 10 abutting against free end 6 of hook member 3. When locking lever 11 is in its disengaged position it permits gate keeper 8 to freely pivot about pin 9. As shown in FIGS. 1, 2 and 4, locking lever 11 is pivotally connected to central shank 2 by means of pin 12. An internal spring 13 bears against shank 2 and locking lever 11 so as to normally retain locking lever 11 in its engaged position.

As is also shown in FIGS. 1, 2 and 4, locking lever 11 includes a pair of locking arms 14 that extend inwardly toward the longitudinal axis of snap hook 1. When locking lever 11 is in its closed position locking arms 14 align with and abut against a pair of locking tabs 15 that extend from gate keeper 8 inwardly toward the longitudinal axis of snap hook 1. With locking arms 14 abutting against locking tabs 15 it will be appreciated that gate keeper 8 cannot be moved from its closed position to its open position without destroying, deforming, or otherwise altering the hook. However, through movement of locking lever 11 from its engaged to its disengaged position, locking arms 14 will no longer be aligned with or abutting locking tabs 15, thereby allowing gate keeper 8 to be moved from its closed to its open position.

In the preferred embodiment movement of locking lever 11 from its engaged to its disengaged position requires the locking lever to be depressed inwardly toward the longitudinal axis of snap hook 1 such that it is received within a cavity 16 in central shank 2. The movement of locking lever 11 will require the application of a sufficient force to its outer surface such that the biasing force of spring 13 is overcome allowing the locking lever to pivot about pin 12 and be received within cavity 16. As locking lever 11 pivots about pin 12 locking arms 14 will be rotated out of alignment with locking tabs 15 and thereby enable gate keeper 8 to be operated without obstruction. When the depressing force on locking lever 11 is released, spring 13 causes the locking lever to be rotated outwardly and returned to its engaged position. As the locking lever rotates upwardly out of cavity 16, locking arms 14 will once again become aligned with and will abut locking tabs 15 to secure and prevent further movement of gate keeper 8. To provide for a smooth engagement and disengagement of locking arms 14 and locking tabs 15, the outer edges of the arms and tabs are slightly rounded.

By way of the above structure it will be appreciated that movement of gate keeper 8 from its closed to its open position will require the application of two distinct and separate forces in two separate directions. That is, locking lever 11 must be depressed inwardly to cause locking arms 14 to disengage locking tabs 15. Once locking arms 14 and locking tabs 15 have been moved out of alignment a separate and distinct force must be applied to the exterior of gate keeper 8 in order to overcome its internal spring and to effectively "open" gateway opening 7. In the embodiment shown in the attached drawings, that the application of the two separate and distinct forces required to open gate keeper 8 are in an inward direction toward the longitudinal axis of snap hook 1 and oriented 180 degrees to each other. In this manner, while two separate and distinct forces are required to open the gate keeper an individual may apply those forces easily by grasping the hook in one of his or her hands.

Snap hook 1 further includes a second locking means 17 that also has an engaged and a disengaged position. When second locking means 17 is in its engaged position it prevents locking lever 11 from being moved between its engaged and disengaged positions. When second locking means 17 is in its disengaged position, it permits locking lever 11 to be moved between its engaged and disengaged positions. That is, second locking means 17 effectively acts as a "lock" for locking lever 11 and will either enable or disable the locking lever.

Movement of second locking means 17 between its engaged and disengaged positions requires the application of force and movement in a direction other than that required to move locking lever 11 between its engaged and disengaged positions. In the preferred embodiment the application of physical force and movement required to enable or disable second locking means 17 is also in a direction other than that required so as to move gate keeper 8 from its closed to its open position. It will therefore be appreciated that movement of gate keeper 8, locking lever 11, and second locking means 17 will thus require the application of force in three distinct and separate directions. In other words, when second locking means 17 is in its engaged position an individual will have to apply force in three distinct and separate directions in order to "open" gate keeper 8.

Figure 5:
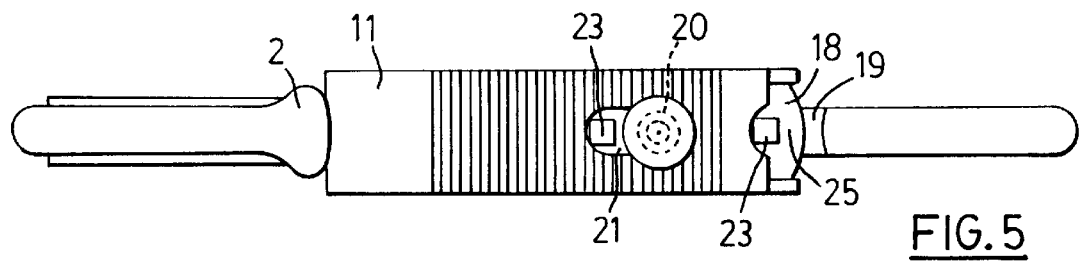
FIG. 5 is a partial plan view of the locking snap hook of FIG. 4.
Figure 6:
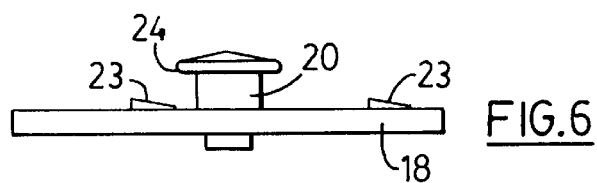
FIG. 6 is a view of the slide gate of the present invention.
Figure 7:
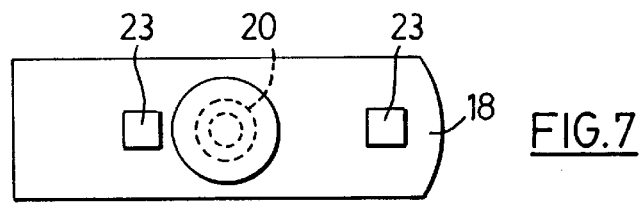
FIG. 7 is a plan view of the slide gate shown in FIG. 6.

As shown in FIGS. 2 through 7, second locking means 17 preferably comprises a slide plate 18 slidably received within locking lever 11. When in its disengaged position (see FIGS. 2 and 3), slide plate 18 is substantially received within locking lever 11 and permits free movement of the locking lever relative to central shank 2. When slide plate 18 is in its engaged position it prevents movement of locking lever 11 through engagement with central shank 2. FIGS. 4 and 5, show slide plate 18 in its engaged position and extended outwardly from locking lever 11 such that it is received over a ledge 19 on shank 2. With the end of slide plate 18 received over ledge 19 the slide plate will effectively prevent the depression of locking lever 11 thereby disabling the ability to displace locking arms 14 from their alignment with locking tabs 15 and preventing the gate keeper from opening.

While in the enclosed drawings slide plate 18 is received over ledge 19 it will be appreciated that a variety of other forms of interaction between slide plate 18 and central shank 2 could equally be used. For example, rather than being received over a ledge in the central shank the end of slide plate 18 could be received within a slot. Alternatively the slide plate may merely ride up over and bear against the outer surface of the shank. Regardless of the precise configuration of the interaction of slide plate 18 and shank 2, in the embodiment shown in the attached drawings in order to move slide plate 18 from its engaged to disengaged position force must be applied in a direction perpendicular to the force required to depress locking lever 11.

To assist in the movement of slide plate 18, the slide plate includes manual activation means in the form of an upwardly extending pin 20. Pin 20 is securely fixed to slide plate 18 and is received through a slot 21 in the outer surface of locking lever 11. Preferably the head 24 of pin 20 is larger than slot 21 so that slide plate 18 is not readily removable from locking lever 11. Movement of slide plate 18 will thus require the application of force to pin 20 so that the plate can be slid outwardly or inwardly beneath locking lever 11. The amount of movement or travel of slide plate 18 will be governed by the relative length of slot 21.

Slide plate 18 is held securely in place adjacent to locking lever 11 with the assistance of spring 13. In the preferred embodiment spring 13 bears against the lower surface of slide plate 18 forcing it against locking lever 11 thereby helping to maintain the slide plate in position. Slide plate 18 also includes friction inducing means 22 that comprises a pair of upwardly extending tabs 23 on the surface of the slide plate. Tabs 23 are positioned such that when slide plate 18 is in its engaged position and extending over ledge 19 one of the tabs protrudes into slot 21 while the second of tabs extends outwardly and bears against the end of locking lever 11. This structure is shown more particularly in FIGS. 4 and 5. In this manner to move slide gate 18 from its engaged to its disengaged position sufficient force must be applied to pin 20 so as to cause tabs 23 to become dislodged from their positions within slot 21 and at the end of locking lever 11. Depending upon the relative size of tabs 23, it may be necessary to apply a slightly downward force upon the head of pin 20 so as to disengage the tabs before pushing slide gate 18 from its engaged to its disengaged position. It should also be appreciated that rather than the use of tabs 23 a variety of other friction inducing means, including knurled or ribbed surfaces between slide plate 18 and locking lever 11, could equally be used. Regardless of the particular nature of the friction inducing means that is ultimately used, the function should be so as to prevent unintentional movement of the slide plate from its engaged to its disengaged position.

It will be understood that the structure of snap hook 1 as described above is effectively a triple action locking mechanism that will prevent the hook from accidentally being removed or displaced from around an eye bolt, cable or other support structure. Since the opening of gate keeper 9 requires the application of three separate and distinct forces in different directions, the likelihood of accidental opening and disengagement of the hook is significantly reduced. The incorporation of second locking means 17 presents an added level of safety over prior devices and prevents accidental movement of locking gate 11 from its engaged to its disengaged position. Furthermore, the configuration and structure of second locking means 17 will not allow gate keeper 8 to be opened by merely squeezing or compressing both sides of the hook against a fixed object, as can sometimes occur during use. Finally, as an added safety feature slide plate 18 may include a visual indicator means 25 that is preferably in the form of a coloured marking on the end of the slide plate. The indicator enables an operator to readily determine whether the slide plate is in its engaged or disengaged position. For example, colouring the end of the slide plate a red colour will allow an operator to merely glance at the hook to determine whether it is in a safe and secure configuration.

It is to be understood that what has been described are the preferred embodiments of the invention and that it may be possible to make variations to these embodiments while staying within the broad scope of the invention. Some of these variations have been discussed while others will be readily apparent to those skilled in the art.

We claim:

1. A self locking snap hook comprising:

(i) a central shank having an arch shaped hook member at one end, said arch shaped hook member having a hook bowl and a free end, said free end of said hook member and said central shank defining a gateway opening therebetween;

(ii) a gate keeper having an open position and a closed position, when in said closed position said gate keeper enclosing said gateway opening, when in said open position said gate keeper allowing passage of an object through said gateway opening into said bowl of said hook member;

(iii) first locking means having an engaged and a disengaged position, when in said engaged position said first locking means preventing said gate keeper from being moved from said closed position to said open position, when in said disengaged position said first locking means permitting said gate keeper to move from said closed to said open position; and, (iv) second locking means having an engaged and a disengaged position, when in said engaged position said second locking means preventing said first locking means from being moved from said engaged to said disengaged position, when in said disengaged position said second locking means permitting said first locking means to be moved from said engaged to said disengaged position, said second locking means including at least one locking tab releasably securing said second locking means to said first locking means, wherein movement of said second locking means between said engaged and said disengaged positions requires the application of force to first release said locking tab of said second locking means from said first locking means and thereafter the application of force and resulting movement of said second locking means in a direction other than that required to move said first locking means from said engaged to said disengaged position.

2. A device is claimed in claim 1 wherein movement of said gate keeper, movement of said first locking means, and movement of said second locking means requires the application of force in three distinct and separate directions.

3. A device is claimed in claim 2 wherein said second locking means comprises a slide plate.

4. A device is claimed in claim 3 wherein said slide plate when in said engaged position preventing movement of said first locking means relative to said central shank.

5. A device as claimed in claim 4 wherein said slide plate includes manual activation means to move said slide plate between said engaged and said disengaged positions.

6. A device is claimed in claim 5 wherein said slide plate, when in said disengaged position, permitting free movement of said first locking means relative to said central shank.

7. A device is claimed in claim 6 wherein said force required to move said slide plate between said engaged position and said disengaged positions is perpendicular to said force required to move said first locking means from said engaged to said disengaged position.

8. A device is claimed in claim 7 wherein said slide plate is slidably received within said first locking means.

9. A device is claimed in claim 8 wherein said first locking means is a locking lever, said locking lever and said gate keeper being a pivotally mounted to said central shank such that when said locking lever is in said engaged position said locking lever physically restricts the pivotal movement of said gate keeper thereby preventing said gate keeper from being moved from its closed to its open position.

10. A device is claimed in claim 9 wherein said slide plate includes visual indicator means allowing an operator to visually determine whether said slide plate is in said engaged or disengaged position.

* * * * *